Sept. 20, 1966  F. A. MILLER  3,273,862
PLASTIC PANELS FOR PLAY YARDS
Filed May 26, 1964
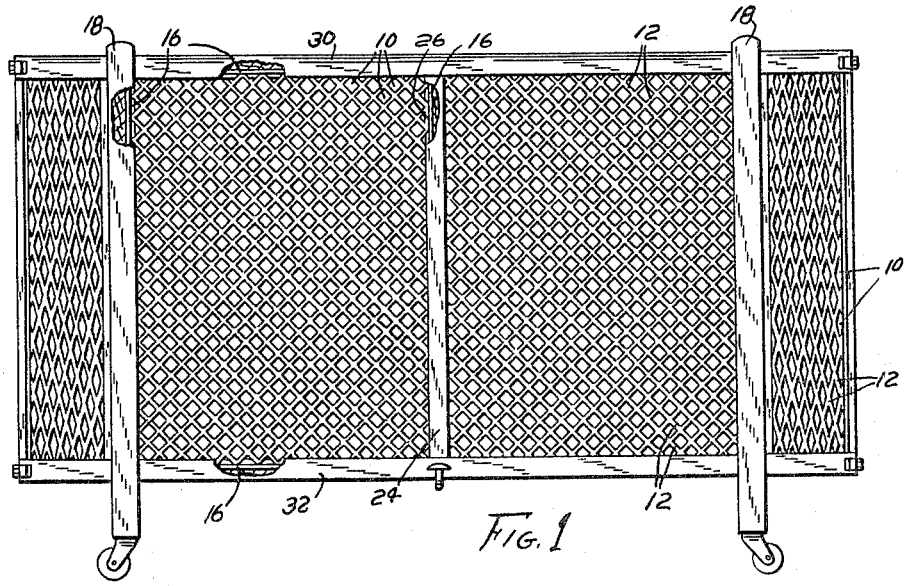
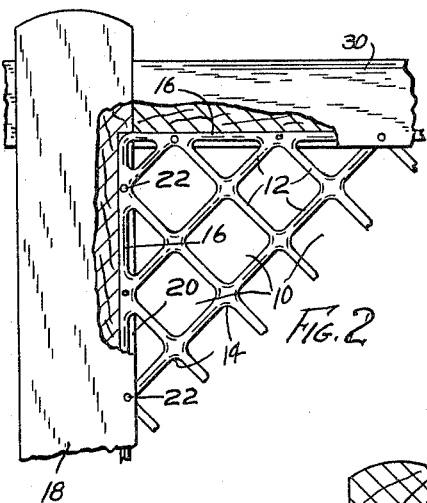
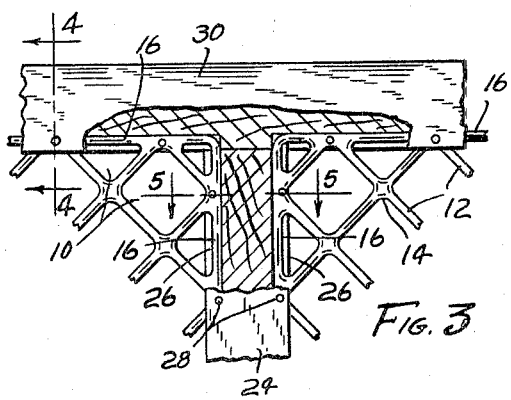
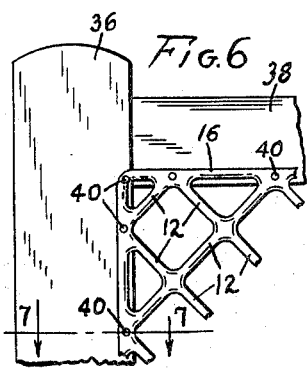
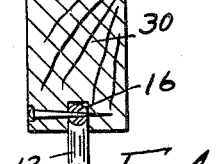
INVENTOR
FRANCIS A. MILLER
by Charles R. Fay
atty.

United States Patent Office 3,273,862
Patented Sept. 20, 1966

3,273,862
PLASTIC PANELS FOR PLAY YARDS
Francis A. Miller, Leominster, Mass., assignor to Joseph P. Miller Co. Inc., Leominster, Mass., a corporation of Massachusetts
Substituted for abandoned application Ser. No. 178,435, Mar. 8, 1962. This application May 26, 1964, Ser. No. 371,875
1 Claim. (Cl. 256—73)

This invention relates to new and improved plastic panels for devices such as play yards for children, and the principal object of the invention resides in the provision of a molded plastic open network panel which is strong and rugged but at the same time has qualities of resilience and softness so as to avoid any injury to the child in the playpen regardless of how active the child may be, and in which the molded plastic panel is sanitary, being easily cleaned, non-deteriorating, and inexpensive to manufacture as well as being easy and inexpensive to attach to the framework which comprises structural parts of the side walls of the play yard.

Further objects of the invention include the provision of a flexible molded plastic panel in open network conformation and having side edge beading around the four sides thereof for securement in grooves or recesses such as rabbets in structural members which hold the molded plastic members in sections having rigid side edges but soft, resilient, net-like center portions, there being two or more plastic panel members provided for a side wall member of a playpen or one plastic panel member for each section of infolding side wall members.

Other objects and advantages of the invention will appear hereinafter.

Reference is to be had to the accompanying drawings in which:

FIG. 1 is a view in front elevation illustrating a form of the invention;

FIGS. 2 and 3 are enlarged views in elevation showing the construction of the plastic network, parts being broken away;

FIG. 4 is an enlarged section on line 4—4 of FIG. 3;

FIG. 5 is an enlarged section on line 5—5 of FIG. 3;

FIG. 6 is a view similar to FIG. 2 showing a modification, and

FIG. 7 is a section on line 7—7 of FIG. 6.

In carrying out the invention, it is pointed out that the plastic panel member of the present invention is made of molded plastic preferably of a strong, tough, semi-flexible material such as certain forms of polyethylene. The panels may be molded in the usual manner in an injection molding machine in single integral panels which are best shown in detail in FIGS. 2 and 3. The panels are molded with large interstices or openings therein which are indicated at 10 and these are formed by cross members such as at 12 which have circular or oval sections, being soft and smooth to the touch and being joined by fillets 14 for extra strength where the members 12 cross each other or abut. These fillets provide rounded corners at all intersections and strongly resist fracture at these points. Without this rounded structure, the corners are apt to tear. Although the members 12 may be horizontal and vertical, it is preferred that they should be located at angles relative to the horizontal and vertical as for instance the 45° angle shown, although any other angle can be used also. About the edges of each plastic panel there is a bead-like member 16 which is continuous and forms a reenforcement and could be made somewhat larger than the cross members 12 in order to provide a basis for fastening the plastic panels into the framework of the play yard sides as is illustrated in FIGS. 2 to 5 inclusive.

FIG. 1 shows a front or rear wall of a play yard having the usual floor (not shown), casters, etc. Any kind of play yard can utilize the present invention such as square and rectangular folding manually or automatically folding play yards, hexagonal play yards, or any other shape. In the present case, however, and as is usual, the play yard itself is provided with corner posts such as at 18 and these corner posts are rabbeted or grooved as for instance at 20 in FIG. 2 so that the bead at 16 of the panel can fit into the recess and be fastened by such means as staples 22 which have ends lying flush with the surfaces of the corner posts at one side only thereof.

The opposite side of a plastic panel abuts for instance another corner post or a center post, this center post being indicated in FIGS. 1, 3 and 5 by the reference numeral 24 and this is grooved at 26, 26 as indicated in FIG. 5 at both edges thereof for the reception of the edge beads 16 of a pair of panels. Otherwise the construction is similar to that above described, the staples at 28, 28 extending through the material of the center post 24 and into and completely through the bead 16 and into the material of the center post at the opposite edge thereof but stopping short of the opposite surface.

The other two edges of the plastic panels are similarly secured in the top rail 30 of the play yard and in the bottom rail 32 thereof, these also being grooved to receive the beading 16 as above described, and similar fasteners or staples being used as before.

In any event it will be seen that each plastic panel is continuously secured firmly about it edges in respect to the structural members of the playpen and thus provides a play yard side walling which is relatively soft and non-injurious to the occupant of the play yard but at the same time being in network shape it provides fingerholds so that the child may pull himself up without injury to his fingers and it is sanitary and easily cleaned and is strong and difficult to break, particularly by the infant himself.

A new and improved means of fastening the panel into the frame members of the playpen is provided and this also provides for the quick and inexpensive manner of assembling the parts of the side walls of the play yard in sections.

FIGS. 6 and 7 show a modification of the invention wherein the plastic panel 12, 16, is merely set onto an open frame as at 36, 38 and secured by fasteners 40 as before except that in this case the entire plastic panel is in view and there are no recesses or grooves in the frame members 36 and 38.

Having thus described my invention and the advantages thereof, I do not wish to be limited to the details herein disclosed, otherwise than as set forth in the claim, but what I claim is:

A panel comprising a molded plastic flexible reticulate one-piece member including a continuous surrounding edge bead and a plurality of mutually spaced runners connected to the edge bead and extending therefrom across the panel to other parts of the edge bead,
   each runner intersecting certain other runners, the corners formed by intersecting runners and by runners and the edge bead being rounded, said rounded corners providing additional strength against rupture, the runners and edge bead being integral.

References Cited by the Examiner

UNITED STATES PATENTS

| | | | |
|---|---|---|---|
| 65,592 | 6/1867 | Paine | 256—24 |
| 2,294,966 | 9/1942 | Dreyfus. | |
| 2,873,094 | 2/1959 | Blum | 256—19 X |
| 3,053,566 | 9/1962 | Allen | 160—215 X |
| 3,118,180 | 1/1964 | Nalle. | |
| 3,134,138 | 5/1964 | Pufahl. | |

FOREIGN PATENTS

| | | |
|---|---|---|
| 64,601 | 6/1946 | Denmark. |
| 1,318,354 | 3/1962 | France. |

HARRISON R. MOSELEY, *Primary Examiner.*

D. L. TAYLOR, *Assistant Examiner.*